US012005702B2

(12) United States Patent
Yoshikawa

(10) Patent No.: US 12,005,702 B2
(45) Date of Patent: Jun. 11, 2024

(54) SUCTION APPARATUS AND PRINTING APPARATUS

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 17/809,022

(22) Filed: Jun. 27, 2022

(65) Prior Publication Data

US 2022/0410594 A1 Dec. 29, 2022

(30) Foreign Application Priority Data

Jun. 28, 2021 (JP) ................................ 2021-106473

(51) Int. Cl.
*B65H 9/08* (2006.01)
*B41J 11/00* (2006.01)

(52) U.S. Cl.
CPC ................................ *B41J 11/0085* (2013.01)

(58) Field of Classification Search
CPC ....... B65H 9/08; F21V 11/14; F21Y 2105/10; B41J 11/0085
See application file for complete search history.

(56) References Cited

U.S. PATENT DOCUMENTS 4,544,265 A * 10/1985 Powers .................. G03B 27/64 355/76
10,358,307 B1 * 7/2019 Liu .................... G03G 15/6558
10,556,750 B2 * 2/2020 Hershkovitz .......... B65G 43/08
11,077,679 B2 * 8/2021 VanKouwenberg ......................... B41J 11/0085
2011/0103928 A1 * 5/2011 Holbrook ............. B41J 11/0085 101/47

FOREIGN PATENT DOCUMENTS

JP 2017-154442 A 9/2017

* cited by examiner

*Primary Examiner* — Leslie A Nicholson, III
(74) *Attorney, Agent, or Firm* — Global IP Counselors, LLP

(57) ABSTRACT

A suction apparatus includes a support portion, a plurality of suction holes formed in the support portion, a suction mechanism configured to perform suction from an outer side of the support portion toward an inner side through the plurality of suction holes, a lighting unit provided on the inner side of the support portion for each region of the support portion, a light transmitting portion configured to transmit light emitted by the lighting unit to the outer side of the support portion, and a control unit configured to control the lighting unit, in which the control unit makes a lighting state of the lighting unit corresponding to a suction region in which suction at the support portion is enabled different from a lighting state of the lighting unit corresponding to a non-suction region in which the suction at the support portion is disabled.

7 Claims, 7 Drawing Sheets

SUCTION APPARATUS AND PRINTING APPARATUS

The present application is based on, and claims priority from JP Application Serial Number 2021-106473, filed Jun. 28, 2021, the disclosure of which is hereby incorporated by reference herein in its entirety.

BACKGROUND

1. Technical Field

The present disclosure relates to a suction apparatus and a printing apparatus.

2. Related Art

A suction apparatus is known in which a suction force is generated in suction holes formed in a suction plate on which a medium is placed to suck the medium on the suction plate (see JP-A-2017-154442).

According to JP-A-2017-154442 above, the number of suction holes in which the suction force is generated is controlled by moving a suction control plate movably arranged for the suction plate.

The user needs to place the medium on the suction plate in a region in which the suction holes in which the suction force is generated are concentrated, that is, a region in which effective suction holes are concentrated.

However, it is difficult for the user to place the medium in an appropriate position because he or she does not know which suction holes are effective.

SUMMARY

A suction apparatus includes a support portion configured to support a medium, a plurality of suction holes formed in the support portion, a suction mechanism, when a side, on which a medium is located, of the support portion is an outer side and a side opposite to the outer side of the support portion is an inner side, configured to perform suction from the outer side of the support portion toward the inner side through the plurality of suction holes, a lighting unit provided on the inner side of the support portion for each region of the support portion, a light transmitting portion configured to transmit light emitted by the lighting unit to the outer side of the support portion, and a control unit configured to control the lighting unit, in which the control unit makes a lighting state of the lighting unit corresponding to a suction region in which suction at the support portion is enabled different from a lighting state of the lighting unit corresponding to a non-suction region in which the suction at the support portion is disabled.

A printing apparatus includes a support portion configured to support a medium, a plurality of suction holes formed in the support portion, a suction mechanism, when a side, on which a medium is located, of the support portion is an outer side and a side opposite to the outer side of the support portion is an inner side, configured to perform suction from the outer side of the support portion toward the inner side through the plurality of suction holes, a lighting unit provided on the inner side of the support portion for each region of the support portion, a light transmitting portion configured to transmit light emitted by the lighting unit to the outer side of the support portion, a printing unit configured to perform printing on the medium supported by the support portion, and a control unit configured to control the lighting unit, in which the control unit makes a lighting state of the lighting unit corresponding to a suction region in which suction at the support portion is enabled different from a lighting state of the lighting unit corresponding to a non-suction region in which the suction at the support portion is disabled.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

Figure 1:
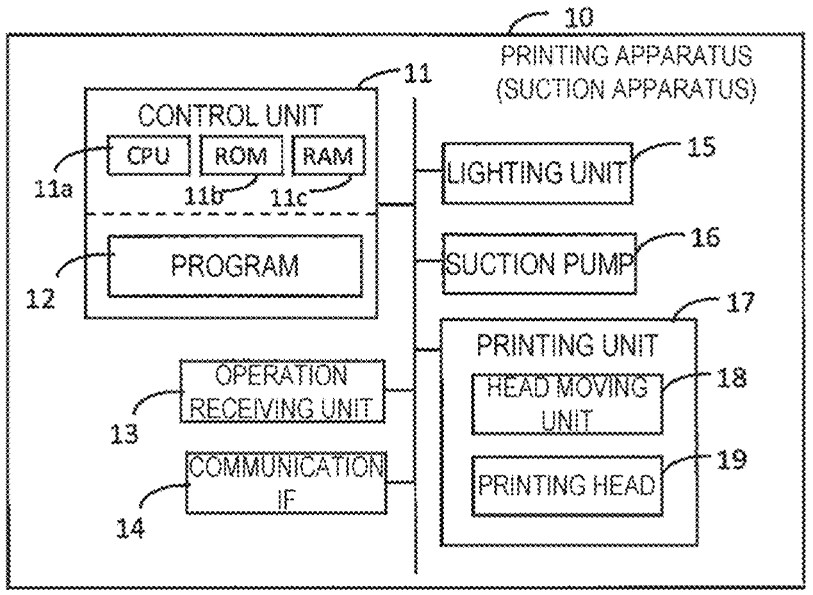
FIG. 1 is a block diagram simply illustrating a configuration of a printing apparatus.

FIG. 1 simply illustrates a configuration of a suction apparatus 10 according to an embodiment. Here, the suction apparatus 10 will be described as a printing apparatus 10.

The printing apparatus 10 includes a control unit 11, an operation receiving unit 13, a communication IF 14, a lighting unit 15, a suction pump 16, a printing unit 17, and the like. The operation receiving unit 13 may include a display unit such as a liquid crystal display or an organic EL display for displaying visual information. IF is an abbreviation for interface. The control unit 11 is configured to include one or more ICs having a CPU 11*a* as a processor, a ROM 11*b*, a RAM 11*c*, and the like, another non-volatile memory, and the like.

In the control unit 11, the processor, that is, the CPU 11*a* controls each unit of the printing apparatus 10 by executing arithmetic processing in accordance with one or more programs 12 stored in the ROM 11*b*, the other memory, or the like, using the RAM 11*c* or the like as a work area. That is, the control unit 11 can execute lighting control for controlling the lighting unit 15, suction control for controlling a suction mechanism, and printing control for controlling the printing unit 17, separately. The printing apparatus 10 implements a suction method and a printing method. Note that the processor is not limited to a single CPU, and may be a configuration in which a plurality of CPUs or a hardware circuit such as an ASIC executes the processing, or may be a configuration in which the CPU and the hardware circuit cooperate to execute the processing.

The operation receiving unit 13 is a device for receiving an operation and input by a user, for example, a physical button, a touch panel, or a keyboard. The touch panel is used as one function of the display unit.

The communication IF 14 is a collective name for one or a plurality of IFs for coupling the printing apparatus 10 with an external terminal by wire or wirelessly in accordance with a prescribed communication protocol including a known communication standard. The printing apparatus 10 can communicate with an external terminal such as a personal computer (PC), a network server, a tablet terminal, or a smartphone through the communication IF 14.

The lighting unit 15 is a collective name for light sources located on the inner side of the support portion 20, as described later. The light source can be, for example, an LED or a fluorescent tube.

The suction pump 16 corresponds to the suction mechanism for sucking a medium placed on the support portion 20 on the support portion 20. The suction mechanism may include the suction pump 16, a tube coupling the suction pump and a space to be sucked.

The printing unit 17 includes a printing head 19 and a head moving unit 18 that moves the printing head 19. The head moving unit 18 can move the printing head 19 two-dimensionally for a surface of the support portion 20 by using power of a motor. The printing head 19 prints an image on a medium supported by the support portion 20 by ejecting a liquid such as ink from a nozzle (not illustrated) in an ink jet system. The medium is typically paper, but may be any material other than paper as long as the material is printable by the printing head 19.

Figure 2:
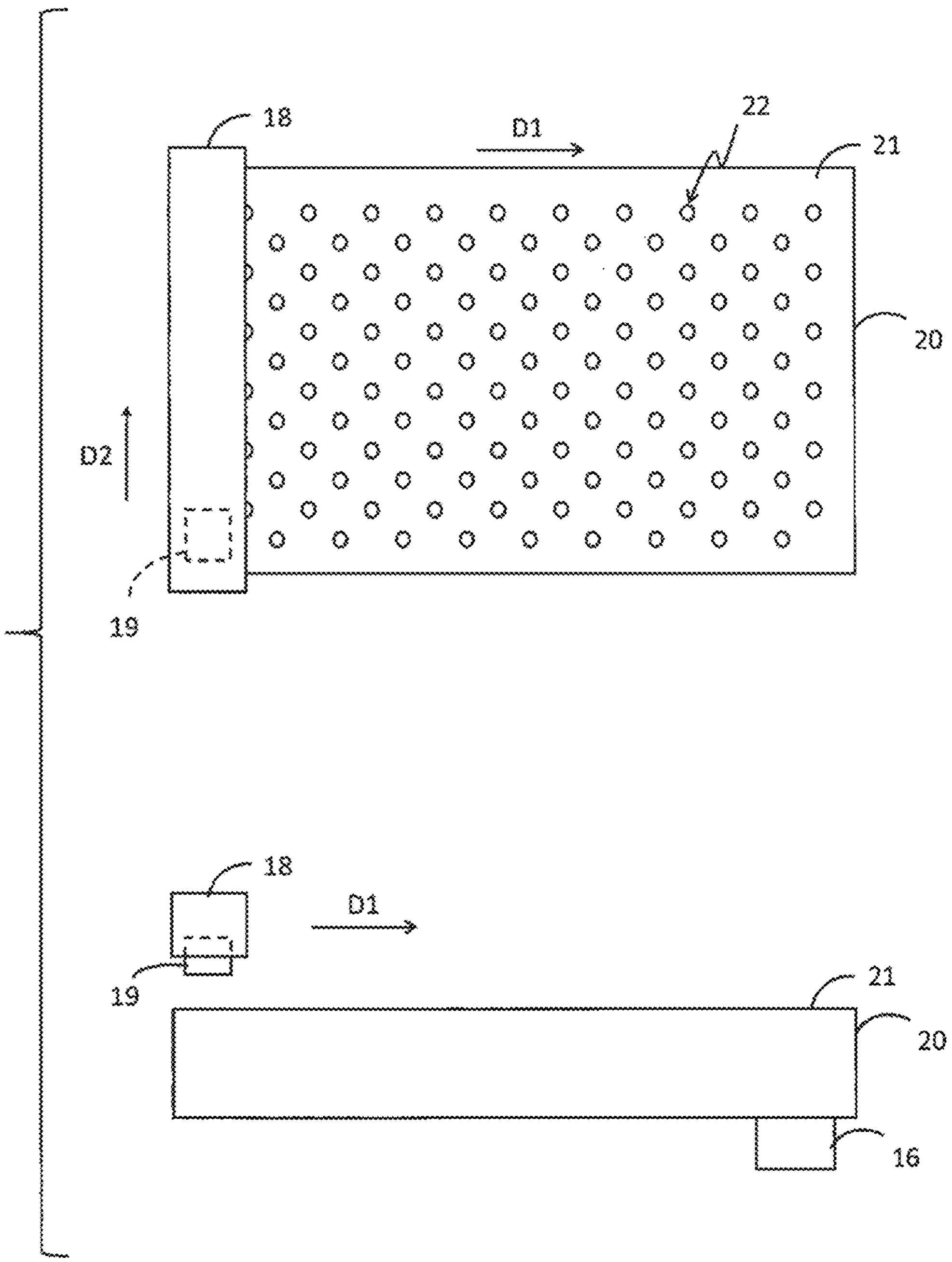
FIG. 2 is a diagram simply illustrating the configuration of the printing apparatus including a support portion viewed from above and viewed from the side.

FIG. 2 simply illustrates a configuration of the printing apparatus 10 including the support portion 20 viewed from above and viewed from the side. The support portion 20 is a table for supporting the medium. The support portion 20 may be referred to as a support table, a document table, a flatbed, a suction plate, a platen, or the like. The support portion 20 has a support surface 21 extending in a first direction D1 and a second direction D2 orthogonal to or substantially orthogonal to the first direction D1. The user places the medium on the support surface 21. "Viewed from the side" here means "facing the second direction D2".

In FIG. 2, a plurality of small circles on the support surface 21 indicate a plurality of suction holes 22. The suction hole 22 extends through the support surface 21 and couples the outer side of the support portion 20 and the internal space. A side where the medium is located with respect to the support portion 20 is the outer side, and a side opposite to the outer side with respect to the support portion 20 is the inner side. The suction pump 16 achieves suction from the outer side to the inner side of the support portion 20 through the suction hole 22 by sucking air in the internal space of the support portion 20. By such suction, the medium placed on the support surface 21 of the support portion 20 is sucked on the support surface 21. By sucking the medium on the support surface 21, curling and floating of the medium are corrected and the posture of the medium is stabilized, thereby improving the printing quality.

The head moving unit 18 is located above the support surface 21. The head moving unit 18 supports the printing head 19. The head moving unit 18 is long in the second direction D2 and has a length longer than a width of the support portion 20 in the second direction D2. The head moving unit 18 can reciprocate along the first direction D1 while supporting the printing head 19. In addition, the head moving unit 18 supports the printing head 19 so that the printing head 19 can reciprocate along the long side direction of the head moving unit 18, that is, the second direction D2. The control unit 11 achieves two-dimensional movement of the printing head 19 for the support surface 21 by controlling the reciprocating movement of the head moving unit 18 along the first direction D1 and the reciprocating movement of the printing head 19 along the second direction D2 by the head moving unit 18.

Figure 3:
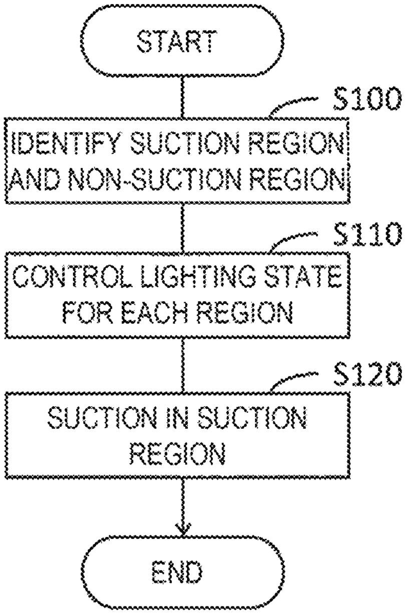
FIG. 3 is a flowchart illustrating lighting/suction control processing.

FIG. 3 illustrates a flowchart of the lighting/suction control processing executed by the control unit 11 according to the program 12.

In step S100, the control unit 11 identifies a "suction region" in which suction is enabled and a "non-suction region" in which suction is disabled in the support portion 20. That is, the control unit 11 grasps which region of the support surface 21 of the support portion 20 is to be used as the suction region. In the embodiment, the support surface 21 is divided into a predetermined number of regions in advance, and the control unit 11 recognizes the position and range of each region. Since any region other than the suction region is the non-suction region, the control unit 11 can identify the suction region and the non-suction region when either the suction region or the non-suction region is known.

For example, the control unit 11 identifies the suction region according to the size of the medium to be printed. The control unit 11 acquires printing instructions by operation of the operation receiving unit 13 by the user or by communication received from an external terminal via the communication IF 14. When the printing instructions include information indicating the paper size, the entire region of the support surface 21 may be identified as the suction region, or part of the region of the support surface 21 may be identified as the suction region, depending on the size indicated by the instructions.

Alternatively, the control unit 11 may identify the suction region and the non-suction region by receiving an input that directly specifies the suction region and the non-suction region from the operation receiving unit 13 or the external terminal operated by the user.

In step S110, the control unit 11 controls a lighting state of the lighting unit 15 for each region according to the suction region and the non-suction region identified in step S100. On the inner side of the support portion 20, the lighting unit 15 is provided for each region of the support portion 20. Thus, in step S110, the control unit 11 makes the lighting state of the lighting unit 15 corresponding to the suction region different from the lighting state of the lighting unit 15 corresponding to the non-suction region.

In the embodiment, the support portion 20 has a "light transmitting portion" that transmits the light emitted by the lighting unit 15 to the outer side of the support portion 20.

As a first example, it is assumed that the light transmitting portion is the suction holes 22. That is, the suction holes 22 also serve as the light transmitting portion.

"To make the lighting states different" means, for example, "to make the lighting colors different". That is, the control unit 11 can turn on the light source corresponding to the suction region with a first color representing the suction region, and turn on the light source corresponding to the non-suction region with a second color representing the non-suction region.

Further, "to make the lighting states different" may mean "to turn on one and turn off the other". For example, the control unit 11 may turn on the light source corresponding to the suction region, and turn off the light source corresponding to the non-suction region.

In addition, "to make the lighting states different" may mean "to make degrees of brightness of lighting different".

For example, the control unit 11 may light the light source corresponding to the suction region brighter than the light source corresponding to the non-suction region.

In addition, "to make the lighting states different" may mean "to make one or the other blink". For example, the control unit 11 may blink the light source corresponding to the suction region and set the light source corresponding to the non-suction region to a state other than blinking.

In addition, "to make the lighting states different" may mean "to make the blinking methods different". For example, the control unit 11 may blink the light source corresponding to the suction region at a first lighting interval representing the suction region, and blink the light source corresponding to the non-suction region at a second lighting interval representing the non-suction region.

The control unit 11 may combine various modes such as color, degree of brightness, blinking, and the like to make the lighting state corresponding to the suction region different from the lighting state corresponding to the non-suction region.

In step S120, the control unit 11 controls the suction mechanism to perform suction targeting the suction region. The execution order of steps S110 and S120 does not have to be as illustrated in FIG. 3. The control unit 11 may start step S120 before step S110, or may start step S110 and step S120 simultaneously.

The inner side of the support portion 20 is divided into internal spaces corresponding to the respective regions of the support surface 21, and the control unit 11 can select to suck or not suck each internal space for each region with the suction pump 16. Thus, in step S120, the control unit 11 may control the suction pump 16 to suck only the internal space corresponding to the suction region.

Figure 4:
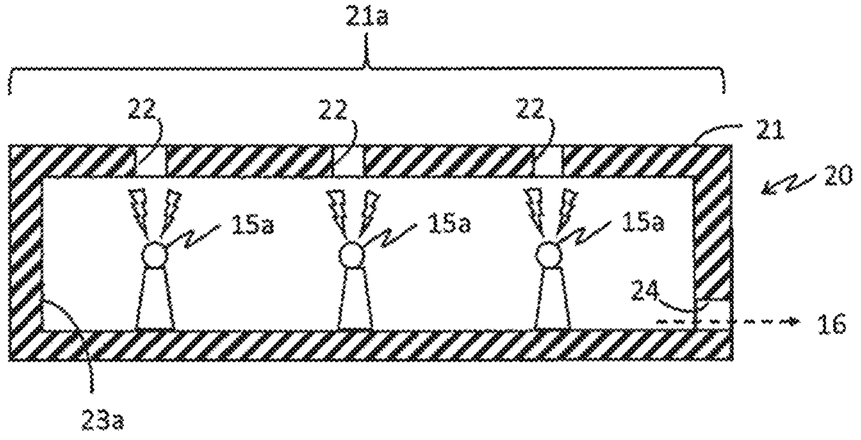
FIG. 4 is a partial cross-sectional view illustrating a first region on a support surface of the support portion and a first internal space.

FIG. 4 illustrates part of the support portion 20. A first region 21*a* on the support surface 21 and a first internal space 23*a* corresponding to the first region 21*a* are simply illustrated by a partial cross-sectional view. A plurality of suction holes 22 passing through the support surface 21 are formed in the first region 21*a*, and one or more light sources 15*a* are fixed in the first internal space 23*a*. The light sources 15*a* in the first internal space 23*a* are the lighting unit 15 corresponding to the first region 21*a*. On the inner side of the support portion 20, such a lighting unit 15 is provided for each region on the support surface 21. When the light source 15*a* is turned on, the light emitted by the light source 15*a* is released to the outer side through the suction hole 22. When the first region 21*a* is part of the suction region, the user can distinguish and recognize the first region 21*a*, which is part of the suction region in the support portion 20, from the non-suction region because the lighting state of the light source 15*a* in the first internal space 23*a* is different from the lighting state of the light source in the internal space of the non-suction region.

The first internal space 23*a* communicates with the suction pump 16 via a communicating portion 24 and a tube (not illustrated). The dashed arrow in FIG. 4 indicates how the air in the first internal space 23*a* is sucked into the suction pump 16 through the communicating portion 24.

For example, the suction pump 16 may be disposed one for each partitioned internal space in the support portion 20, and the internal space and the suction pump 16 may communicate with each other on a one-to-one basis. In this case, the control unit 11 may cause the suction pump 16 corresponding to the internal space to suck the internal space corresponding to the suction region.

Alternatively, the suction pump 16 may be configured to be disposed one for all or a plurality of internal spaces in the support portion 20. In this case, the control unit 11 can set the suction or non-suction state for each of the plurality of internal spaces by opening or closing the tube or the communicating portion 24 that communicates the suction pump 16 to each of the plurality of internal spaces with an individual valve or the like.

In the example illustrated in FIG. 4, a plurality of light sources 15*a* are disposed at positions corresponding to the plurality of suction holes 22, respectively, in the first internal space 23*a*. The position corresponding to the suction hole 22 means the position that matches or substantially matches the suction hole 22 in the first direction D1 and the second direction D2. According to this configuration, the light by the light source 15*a* can be efficiently transmitted to the outer side through the suction hole 22. However, such a configuration is merely an example, and the number of suction holes 22 in the region does not have to match the number of light sources in the internal space corresponding to this region. Also, the position of the suction hole 22 may be shifted from the position of the light source in the internal space.

After going through the processing in the flowchart in FIG. 3, the user places the medium on the support portion 20. At this time, the user can easily identify the suction region on the support surface 21 visually, so that the medium can be placed in the suction region without mistake. Although not illustrated in FIG. 3, the control unit 11 causes the printing unit 17 to perform printing on the medium placed in the suction region of the support portion 20.

Figure 5A:
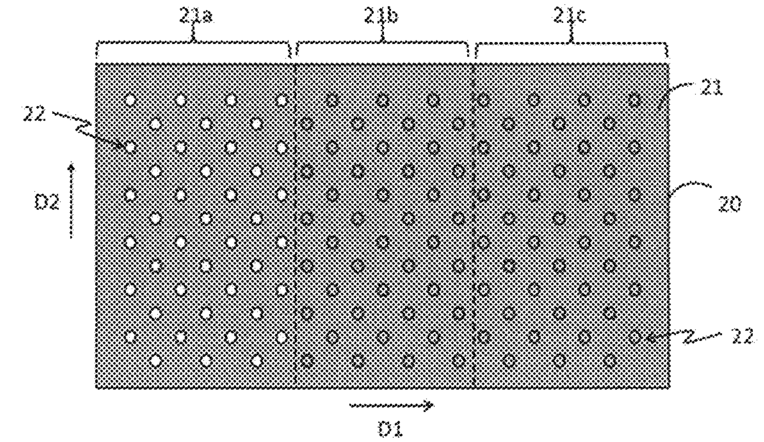
FIG. 5A is a diagram for describing a difference in visibility between a suction region and a non-suction region in a first example.
Figure 5B:
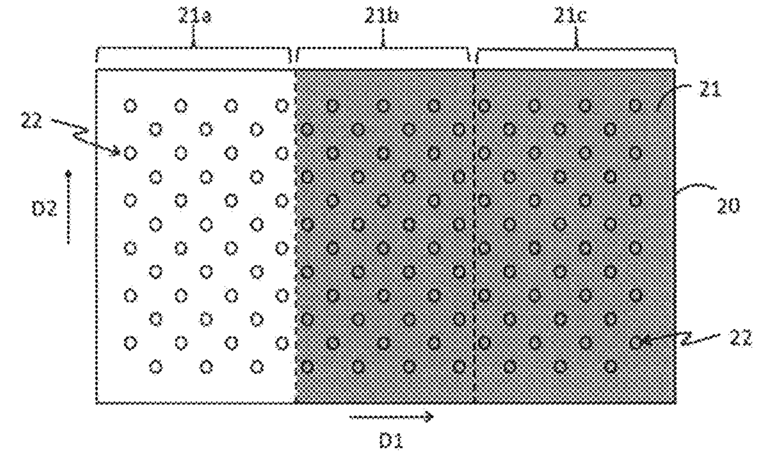
FIG. 5B is a diagram for describing a difference in visibility between the suction region and the non-suction region in a second example.
Figure 5C:
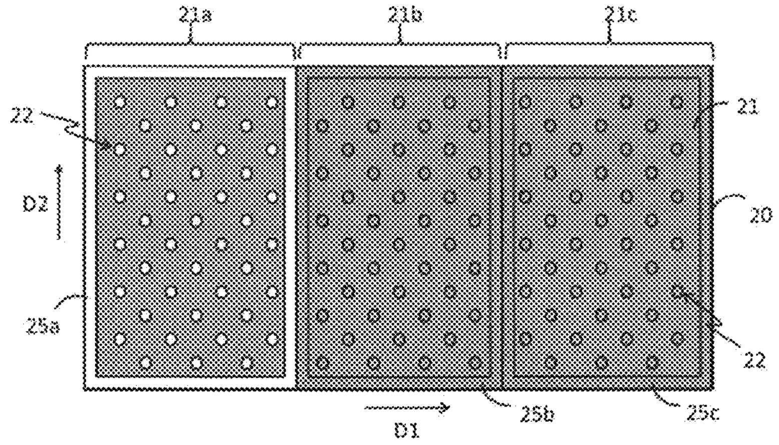
FIG. 5C is a diagram for describing a difference in visibility between the suction region and the non-suction region in a third example.

FIG. 5A is a diagram for describing a difference in visibility between the suction region and the non-suction region in the first example, and illustrates the support portion 20 viewed from above. In FIG. 5A and FIGS. 5B and 5C described later, the head moving unit 18 and the printing head 19 are omitted, and the support surface 21 and the plurality of suction holes 22 formed on the support surface 21 are illustrated.

In the example of FIG. 5A, the support surface 21 is divided into three regions, the first region 21*a*, a second region 21*b*, and a third region 21*c*, and the internal space as illustrated in FIG. 4 is formed in the support portion 20 corresponding to each of these three regions. The number of regions is not limited to three, and may be two, four, or more.

In the example of FIG. 5A, it is assumed that the first region 21*a* is the suction region, and the second region 21*b* and the third region 21*c* are the non-suction region. In FIG. 5A, the suction holes 22 in the first region 21*a* are illustrated in white, and the suction holes 22 in the second region 21*b* and the third region 21*c* are illustrated in gray to visually represent an example in which the lighting state of the lighting unit 15 corresponding to the suction region is different from the lighting state of the lighting unit 15 corresponding to the non-suction region. In addition, in FIG. 5A, in order to emphasize the suction holes 22 in the first region 21*a*, the color of the support surface 21 itself, which is not a light transmitting portion, is also expressed in the same gray color as the suction holes 22 in the second region 21*b* and the third region 21*c*. A user who sees the support portion 20 illustrated in FIG. 5A can easily recognize that the first region 21*a* is the suction region and place the medium in the first region 21*a*.

FIG. 5B is a diagram for describing a difference in visibility between the suction region and the non-suction region in a second example. The way of viewing FIG. 5B is the same as the way of viewing FIG. 5A. Here, in the second example, it is assumed that the light transmitting portion is the plate surface of the support portion 20, that is, the support surface 21 itself. Specifically, in the second example, the plate member constituting the support surface 21 may be a light-guiding plate or a transparent member such as glass or plastic. According to such a configuration, the support surface 21 itself can guide the light on the inner side of the support portion 20 to the outer side of the support portion 20.

Also in FIG. 5B, it is assumed that the first region 21*a* is the suction region, and the second region 21*b* and the third region 21*c* are the non-suction region. In FIG. 5B, the first region 21*a* of the support surface 21 is illustrated in white, and the second region 21*b* and the third region 21*c* are illustrated in gray to visually represent an example in which the lighting state of the lighting unit 15 corresponding to the suction region is different from the lighting state of the lighting unit 15 corresponding to the non-suction region. A user who sees the support portion 20 illustrated in FIG. 5B can easily recognize that the first region 21*a* is the suction region and place the medium in the first region 21*a*.

FIG. 5C is a diagram for describing a difference in visibility between the suction region and the non-suction region in a third example. The way of viewing FIG. 5C is the same as the ways of viewing FIGS. 5A and 5B. Here, in the third example, it is assumed that the light transmitting portion is a member having light guiding properties or light transmission properties that surrounds each region of the support portion 20 in a frame shape region by region. In the example of FIG. 5C, when the support surface 21 is viewed from above, the first region 21*a* is surrounded by a first frame portion 25*a*, the second region 21*b* is surrounded by a second frame portion 25*b*, and the third region 21*c* is surrounded by a third frame portion 25*c*. These frame portions 25*a*, 25*b*, and 25*c* are light transmitting portions and are formed of a light-guiding plate or a member having light transmission properties. According to such a configuration, the frame portions 25*a*, 25*b*, and 25*c* can guide the light on the inner side of the support portion 20 to the outer side of the support portion 20.

A difference between FIG. 5B and FIG. 5C can be explained as a difference in whether each region on the support surface 21 is a member having light guiding properties or light transmission properties as a whole, or a member having light guiding properties or transparency in part. Also in FIG. 5C, it is assumed that the first region 21*a* is the suction region, and the second region 21*b* and the third region 21*c* are the non-suction region. In FIG. 5C, the first frame portion 25*a* is illustrated in white, and the second frame portion 25*b* and the third frame portion 25*c* are illustrated in gray to visually represent an example in which the lighting state of the lighting unit 15 corresponding to the suction region is different from the lighting state of the lighting unit 15 corresponding to the non-suction region. A user who sees the support portion 20 illustrated in FIG. 5C can easily recognize that the first region 21*a* is the suction region and place the medium in the first region 21*a*.

Note that, as can be seen from FIGS. 5B and 5C, also in the second example and the third example, the suction holes 22 function as light transmitting portion as in the first example. However, in the second example and the third example, the support surface 21 and the frame portions 25*a*, 25*b*, and 25*c* of the support surface 21 may be formed with light-guiding plates, respectively, so that the light-guiding plate emits light by the light source on the inner side of the support portion 20, and the suction holes 22 themselves may not function as the light transmitting portion.

Further, the control unit 11 may control the lighting state of the lighting unit 15 in accordance with the progress or result of printing on the medium placed on the support surface 21.

As a fourth example, the control unit 11 makes, in the suction region, the lighting state of the lighting unit 15 in a "printing completed region" in which the printing by the printing unit 17 on the medium placed in the suction region is completed different from the lighting state of the lighting unit 15 in a "printing incomplete region" in which printing on the medium is not completed.

Figure 6:
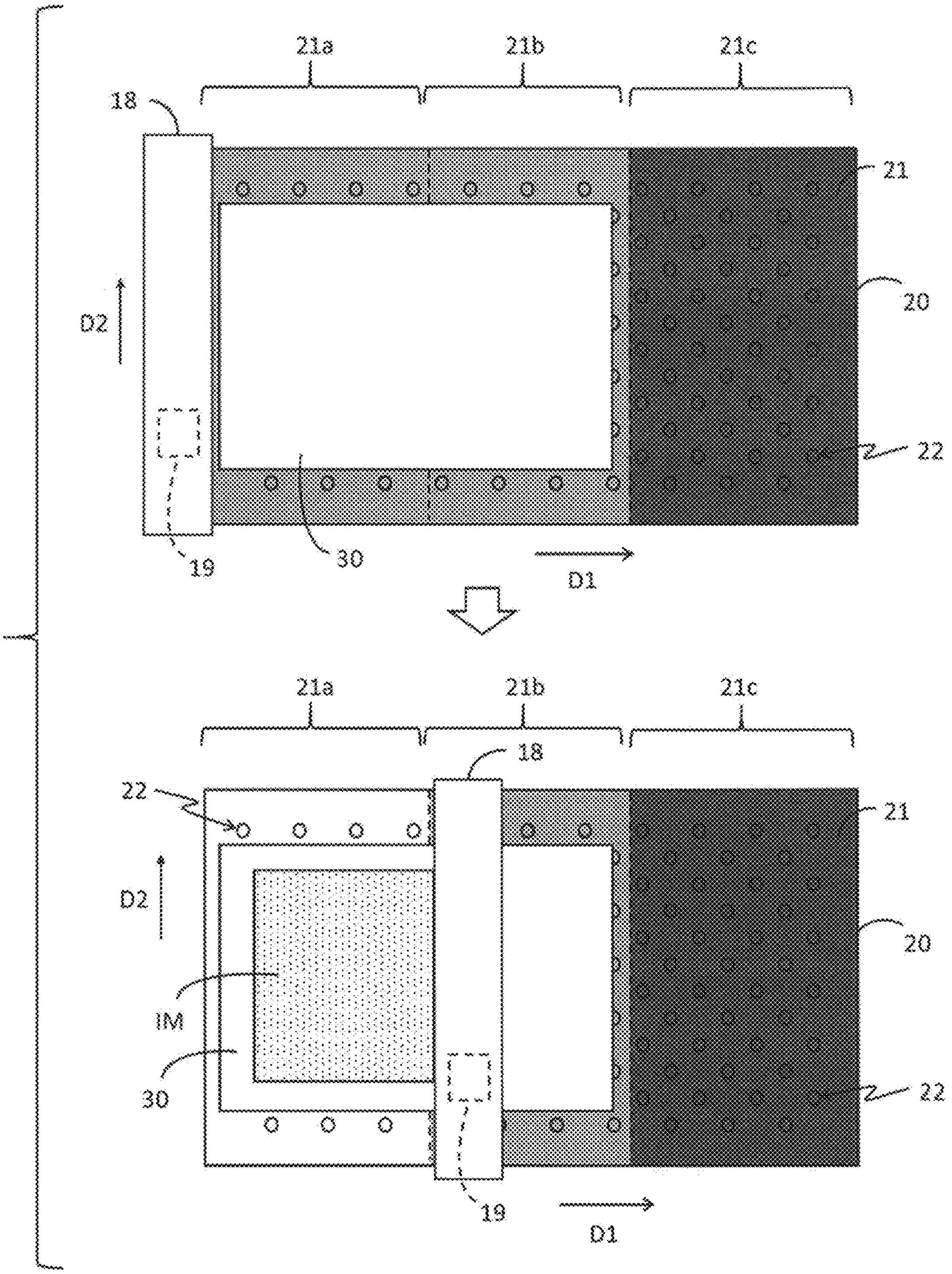
FIG. 6 is a diagram for describing a fourth example.
Figure 7:
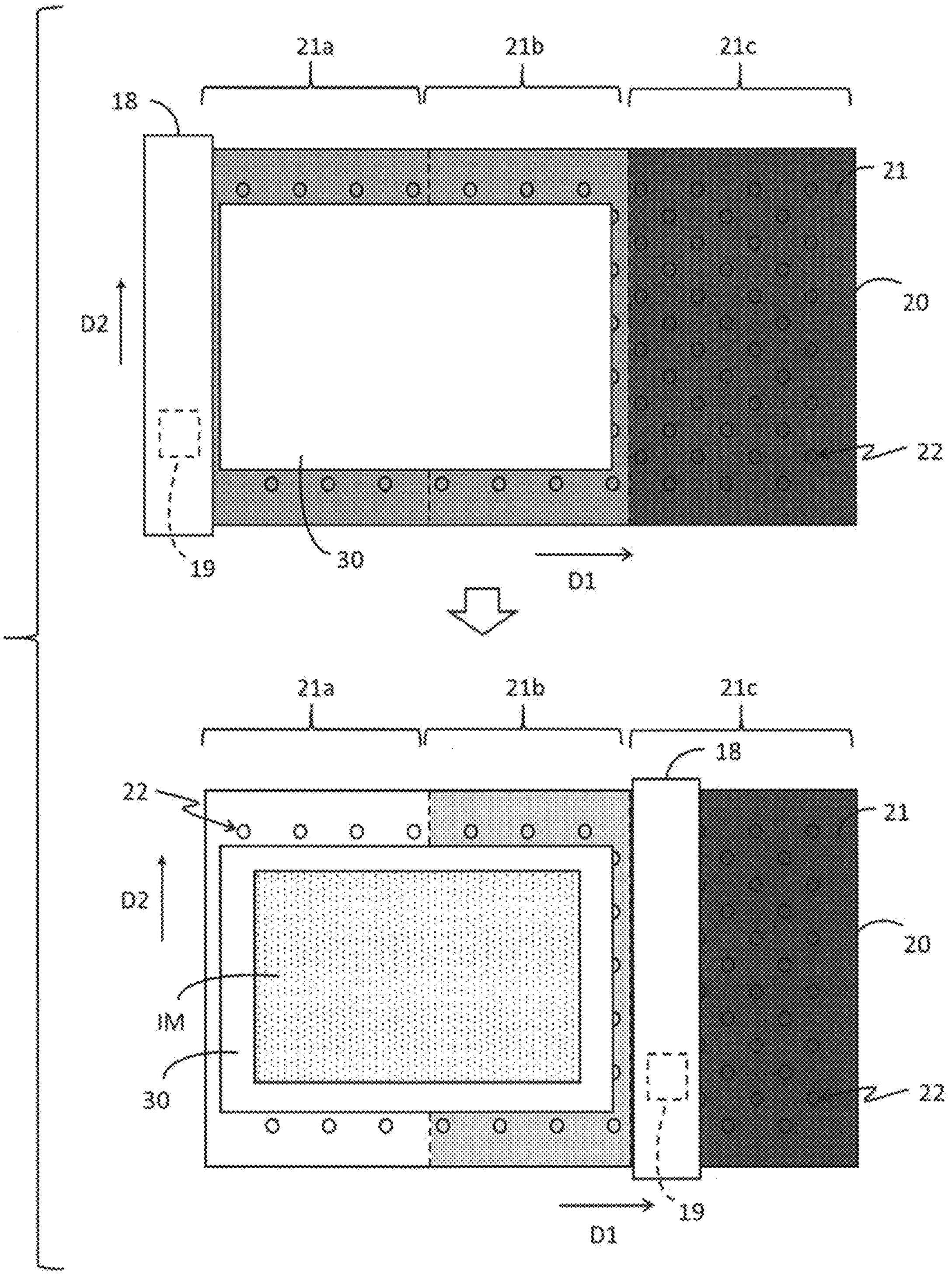
FIG. 7 is a diagram for describing a fifth example.

FIG. 6 is a diagram for describing the fourth example, and illustrates the support portion 20 viewed from above. In FIG. 6 and FIG. 7, which relates to a fifth example described later, the head moving unit 18 and the printing head 19 are illustrated as in FIG. 2. In the fourth example and the fifth example, the light transmitting portion may be adopted from any of the first to third examples. In FIGS. 6 and 7, the light transmitting portion of the second example described in FIG. 5B is employed.

In the example illustrated in FIG. 6, it is assumed that the control unit 11 determines that the first region 21*a* and the second region 21*b* are the suction region, and the third region 21*c* is the non-suction region in the flowchart in FIG. 3. Thus, in step S110, the control unit 11 makes the lighting state by the lighting unit 15 in the first region 21*a* and the second region 21*b* different from the lighting state by the lighting unit 15 in the third region 21*c* as illustrated in an upper part of FIG. 6. As a result, the user recognizes the first region 21*a* and the second region 21*b* as the suction region, and places the medium 30 in the first region 21*a* and the second region 21*b*. In step S120, the control unit 11 causes the suction pump 16 to suck the internal spaces corresponding to the first region 21*a* and the second region 21*b*, respectively.

Thereafter, the control unit 11 controls the head moving unit 18 and the printing head 19 to start printing on the medium 30. The control unit 11 repeatedly makes the printing head 19 eject ink while moving the printing head 19 along the second direction D2, and moves the head moving unit 18 a predetermined distance in the first direction D1, to advance printing on the medium 30. As such printing progresses, a printing image IM is gradually formed on the medium 30.

When printing on a portion of the medium 30 in the first region 21*a* is completed and the head moving unit 18 advances to the second region 21*b*, as illustrated in a lower part of FIG. 6, the control unit 11 makes the lighting state of the light source corresponding to the first region 21*a* different from the lighting state of the light source corresponding to the second region 21*b*. That is, at the timing illustrated in the lower part of FIG. 6, the first region 21*a* corresponds to the printing completed region, and the second region 21*b* corresponds to the printing incomplete region. According to the fourth example described above, the user can easily recognize the region in which the printing is completed and the region in which the printing is not completed in accordance with the progress of printing on the medium 30 sucked on the support portion 20.

As the fifth example, in the suction region, the control unit 11 makes the lighting state of the lighting unit 15 in a "printing normally completed region" in which printing by the printing unit 17 on the medium placed in the suction region is normally completed different from the lighting state of the lighting unit 15 in a "printing abnormally completed region" in which printing on the medium is completed in an abnormal state.

FIG. 7 is a diagram for describing the fifth example, and illustrates the support portion 20 viewed from above. For FIG. 7, the difference from FIG. 6 will be described. The contents illustrated in an upper part of FIG. 7 are the same as the contents illustrated in the upper part of FIG. 6. When printing on the medium 30 placed in the first region 21*a* and in the second region 21*b*, which are the suction region, is completed, it is assumed that the control unit 11 determines, for example, printing on a portion of the medium 30 in the first region 21*a* is normally completed, and printing on a portion of the medium 30 in the second region 21*b* is completed in an abnormal state. In such a case, when the head moving unit 18 advances to the third region 21*c*, as illustrated in a lower part of FIG. 7, the control unit 11 makes the lighting state of the light source corresponding to the first region 21*a* different from the lighting state of the light source corresponding to the second region 21*b*. In other words, in the example of the lower part of FIG. 7, the first region 21*a* corresponds to the printing normally completed region, and the second region 21*b* corresponds to the printing abnormally completed region.

Note that the definition of "printing is completed in an abnormal state" varies. The control unit 11 may determine that printing is completed in an abnormal state, for example, when the head moving unit 18 passes through in a state of running out of ink during printing, when the medium 30 is not properly sucked on the support surface 21 and the medium 30 comes into contact with or abnormally approaches the printing head 19, or when a vibration larger than a predetermined level is detected during printing. According to the fifth example described above, the user can easily recognize, for the medium 30 sucked on the support portion 20, a region in which printing is normally completed and a region in which printing is not normally completed.

It is also possible to combine the fourth example and the fifth example. In this case, the control unit 11 may make the lighting states by the lighting units 15 different from each other in the printing (normally) completed region, the printing incomplete region, and the printing abnormally completed region.

As described above, according to the embodiment, a suction apparatus 10 includes a support portion 20 configured to support a medium, a plurality of suction holes 22 formed in the support portion 20, a suction mechanism, when a side, on which a medium is located, of the support portion is an outer side 20 and a side opposite to the outer side of the support portion is an inner side 20, configured to perform suction from the outer side of the support portion 20 toward the inner side through the plurality of suction holes 22, a lighting unit 15 provided on the inner side of the support portion 20 for each region of the support portion 20, a light transmitting portion configured to transmit light emitted by the lighting unit 15 to the outer side of the support portion 20, and a control unit 11 configured to control the lighting unit 15. The control unit 11 makes a lighting state of the lighting unit 15 corresponding to a suction region in which suction at the support portion 20 is enabled different from a lighting state of the lighting unit 15 corresponding to a non-suction region in which the suction at the support portion 20 is disabled.

According to the configuration described above, the user can easily grasp the suction region in the support portion 20 and place the medium in the suction region without mistake, because the user can visually recognize the difference between the lighting state in the suction region and the lighting state in the non-suction region by the light transmitting portion.

As described above, the light transmitting portion is, for example, the suction holes 22. By having the suction holes 22 that also serve as the light transmitting portion, the support portion 20 can be made into a simple structure.

Further, the light transmitting portion may be a plate surface of the support portion 20, or may be a member having light guiding properties or light transmission properties that surrounds each region of the support portion 20 in a frame shape region by region.

In addition, according to the embodiment, a printing apparatus 10 includes a support portion 20 configured to support a medium, a plurality of suction holes 22 formed in the support portion 20, a suction mechanism, when a side, on which a medium is located, of the support portion is an outer side 20 and a side opposite to the outer side of the support portion is an inner side 20, configured to perform suction from the outer side of the support portion 20 toward the inner side through the plurality of suction holes 22, a lighting unit 15 provided on the inner side of the support portion 20 for each region of the support portion 20, a light transmitting portion configured to transmit light emitted by the lighting unit 15 to the outer side of the support portion 20, a printing unit 17 configured to perform printing on the medium supported by support portion 20, and a control unit 11 configured to control the lighting unit 15, in which the control unit 11 makes a lighting state of the lighting unit 15 corresponding to a suction region in which suction at the support portion 20 is enabled different from a lighting state of the lighting unit 15 corresponding to a non-suction region in which the suction at the support portion 20 is disabled.

According to the configuration described above, the user can easily grasp the suction region in the support portion 20 and place the medium in the suction region without mistake, because the user can visually recognize the difference between the lighting state in the suction region and the lighting state in the non-suction region by the light transmitting portion.

In addition, according to the embodiment, the control unit 11 may make, in the suction region, a lighting state of the lighting unit 15 in a printing completed region in which printing by the printing unit 17 on the medium 30 placed in the suction region is completed different from a lighting state of the lighting unit 15 in a printing incomplete region in which printing by the printing unit 17 on the medium 30 placed in the suction region is not completed.

According to the configuration described above, in addition to being able to recognize the suction region in the support portion 20, the user can identify the printing completed region and the printing incomplete region in the support portion 20.

In addition, according to the embodiment, the control unit 11 may make, in the suction region, a lighting state of the lighting unit 15 in a printing normally completed region in which printing by the printing unit 17 on the medium 30 placed in the suction region is normally completed different from a lighting state of the lighting unit 15 in a printing abnormally completed region in which printing by the printing unit 17 on the medium 30 placed in the suction region is completed in an abnormal state.

According to the configuration described above, in addition to being able to recognize the suction region in the support portion 20, the user can identify the printing normally completed region and the printing abnormally completed region in the support portion 20.

The embodiment discloses not only the apparatus but also various categories of disclosure such as the method in each control process performed by the apparatus and the program 12 that allows the processor to execute the method.

The suction apparatus 10 is not limited to the printing apparatus, and may also be configured without the printing unit 17. That is, the features of the suction apparatus 10 according to the embodiment can be applied in situations and configurations where it is necessary to suck a medium that is a subject of some process other than printing, such as reading, heating, drying, processing, or transporting on a specific table or surface.

What is claimed is:

1. A suction apparatus comprising:

a support portion configured to support a medium and have a plurality of regions;

a plurality of suction holes formed in the support portion;

a suction mechanism, when a side, on which a medium is located, of the support portion is an outer side and a side opposite to the outer side of the support portion is an inner side, configured to perform suction from the outer side of the support portion toward the inner side through the plurality of suction holes;

a lighting unit provided on the inner side of the support portion for each region of the support portion;

a light transmitting portion configured to transmit light emitted by the lighting unit to the outer side of the support portion; and a control unit configured to control the lighting unit, wherein the control unit makes a lighting state of the lighting unit corresponding to a suction region in which suction at the support portion is enabled different from a lighting state of the lighting unit corresponding to a non-suction region in which the suction at the support portion is disabled.

2. The suction apparatus according to claim 1, wherein the light transmitting portion is the plurality of suction holes.

3. The suction apparatus according to claim 1, wherein the light transmitting portion is a plate surface of the support portion.

4. The suction apparatus according to claim 1, wherein the light transmitting portion is a member having light guiding properties or light transmission properties that surrounds each region of the support portion in a frame shape region by region.

5. A printing apparatus comprising:

a support portion configured to support a medium and have a plurality of regions;

a plurality of suction holes formed in the support portion;

a suction mechanism, when a side, on which a medium is located, of the support portion is an outer side and a side opposite to the outer side of the support portion is an inner side, configured to perform suction from the outer side of the support portion toward the inner side through the plurality of suction holes;

a lighting unit provided on the inner side of the support portion for each region of the support portion;

a light transmitting portion configured to transmit light emitted by the lighting unit to the outer side of the support portion;

a printing unit configured to perform printing on the medium supported by the support portion; and a control unit configured to control the lighting unit, wherein the control unit makes a lighting state of the lighting unit corresponding to a suction region in which suction at the support portion is enabled different from a lighting state of the lighting unit corresponding to a non-suction region in which the suction at the support portion is disabled.

6. The printing apparatus according to claim 5, wherein the control unit makes, in the suction region, a lighting state of the lighting unit in a printing completed region in which printing by the printing unit on the medium placed in the suction region is completed different from a lighting state of the lighting unit in a printing incomplete region in which printing by the printing unit on the medium placed in the suction region is not completed.

7. The printing apparatus according to claim 5, wherein the control unit makes, in the suction region, a lighting state of the lighting unit in a printing normally completed region in which printing by the printing unit on the medium placed in the suction region is normally completed different from a lighting state of the lighting unit in a printing abnormally completed region in which printing by the printing unit on the medium placed in the suction region is completed in an abnormal state.

* * * * *